United States Patent
Sparling

(10) Patent No.: US 10,789,192 B2
(45) Date of Patent: Sep. 29, 2020

(54) SYSTEM AND METHOD FOR PROGRAMMING DATA TRANSFER WITHIN A MICROCONTROLLER

(71) Applicant: RENESAS ELECTRONICS AMERICA INC., Milpitas, CA (US)

(72) Inventor: Dale Sparling, Santa Clara, CA (US)

(73) Assignee: RENESAS ELECTRONICS AMERICA INC., Santa Clara, CA (US)

(*) Notice: Subject to any disclaimer, the term of this patent is extended or adjusted under 35 U.S.C. 154(b) by 1 day.

(21) Appl. No.: 16/080,294

(22) PCT Filed: Feb. 28, 2017

(86) PCT No.: PCT/US2017/019902
§ 371 (c)(1),
(2) Date: Aug. 27, 2018

(87) PCT Pub. No.: WO2017/151588
PCT Pub. Date: Sep. 8, 2017

(65) Prior Publication Data
US 2019/0018810 A1 Jan. 17, 2019

Related U.S. Application Data

(60) Provisional application No. 62/300,953, filed on Feb. 29, 2016.

(51) Int. Cl.
*G05B 19/042* (2006.01)
*G05B 19/045* (2006.01)
(Continued)

(52) U.S. Cl.
CPC .............. *G06F 13/28* (2013.01); *G06F 13/14* (2013.01); *G06F 13/1673* (2013.01); *G06F 13/24* (2013.01)

(58) Field of Classification Search
CPC .......... G06F 13/14; G06F 13/24; G06F 13/28; G06F 13/1673
(Continued)

(56) References Cited

U.S. PATENT DOCUMENTS

2008/0148083 A1* 6/2008 Pesavento ............. G06F 1/3203
713/322
2013/0290980 A1* 10/2013 Kemp ...................... G06F 13/00
719/312

(Continued)

*Primary Examiner* — Idriss N Alrobaye
*Assistant Examiner* — Brooke J Taylor
(74) *Attorney, Agent, or Firm* — Foley & Lardner LLP

(57) ABSTRACT

A method and system for programming a microcontroller (MCU) to implement a data transfer, the MCU having a flash memory, a central processing unit (CPU) and a direct memory access controller (DMAC). In one embodiment, the method includes calling a function stored in the flash memory, wherein a first parameter is passed to the function when it is called, wherein the first parameter identifies a first data structure that is stored in flash memory, and wherein the first data structure includes first DMAC control values. The CPU reads the first DMAC control values in response to the CPU executing instructions of the function. The CPU then writes the first DMAC control values to respective control registers of the DMAC in response to the CPU executing instructions of the function.

17 Claims, 3 Drawing Sheets

(51) Int. Cl.
   *G06F 13/28* (2006.01)
   *G06F 13/14* (2006.01)
   *G06F 13/16* (2006.01)
   *G06F 13/24* (2006.01)
(58) Field of Classification Search
   USPC .......................................................... 710/22
   See application file for complete search history.

(56) References Cited

U.S. PATENT DOCUMENTS

2014/0359223 A1\* 12/2014 Yu ........................ G06F 11/1064
                                                            711/128
2018/0165027 A1\* 6/2018 Beeken ................. G06F 3/0619

\* cited by examiner

SYSTEM AND METHOD FOR PROGRAMMING DATA TRANSFER WITHIN A MICROCONTROLLER

RELATED APPLICATIONS

This application claims the domestic benefit under Title 35 of the United States Code § 119(e) of U.S. Provisional Patent Application Ser. No. 62/300,953, entitled "Pipes and Signals", filed Feb. 29, 2016, which is hereby incorporated by reference in its entirety and for all purposes as if completely and fully set forth herein.

BACKGROUND OF THE INVENTION

A microcontroller (MCU) is a small computer formed on an integrated circuit. MCUs provide embedded control of a wide range of devices, such as office machines, appliances, automobile engine control systems, implantable medical devices, power tools, toys, etc.

MCUs vary in architecture. However, nearly all MCUs contain a central processing unit (CPU), flash memory, random access memory (RAM), one or more peripherals that provide dedicated functions, and one or more general purpose input/output (GPI/O) ports.

The CPU can process data held in RAM in accordance with instructions of an embedded program stored in flash memory. Before the CPU can process the data, however, the data must be moved into RAM. There are several ways to move data to RAM. One method is called programmed I/O. In this method the CPU can transfer data from a source (e.g., a peripheral such as a UART or Universal Asynchronous Receiver/Transmitter) to RAM by executing a load or store operation. The CPU may have to wait for a ready signal from the source before transferring each byte or word, which can be done by polling a status register for the source or by handling a "ready" interrupt from the source. Unfortunately the CPU cannot perform other operations while it is transferring data.

Direct memory access (DMA) is an alternative method for transferring data. This process is managed by a device known as a DMA controller (DMAC). In DMA, data is transferred directly without the CPU handling each byte (or word). In other words, DMA data transfer is CPU independent. DMA transfer can move a large amount of data from a source (e.g., a peripheral) to a destination (e.g., (RAM)) very quickly. The more obvious benefit of DMA data transfer is that the CPU can do something else while the DMAC is transferring data. It takes some CPU usage, however, to set up the DMA transfer, but after that, data is transferred without involving the CPU.

As noted, before a DMA transfer can occur, the CPU must program the DMAC. In other words, the CPU must tell the DMAC what data to transfer, where to transfer the data, and how to transfer the data. The CPU programs the DMAC by writing the appropriate control values to respective control registers thereof. The control values define the transfer. For example the control values identify the source (e.g., the UART) of data to be transferred, the destination of the data, how much data is to be transferred, the width of the data, the mode in which the data is to be transferred (e.g., burst mode, demand mode, transparent mode, address increment mode, single cycle mode, write transfer, etc.), etc.

During runtime, the DMAC can be repeatedly reprogrammed by the CPU with different control values to implement different DMA data transfers. The CPU executes distinct code when it reprograms a DMAC. For example, the code needed to program the DMAC for transferring data from a UART to RAM, will be different from the code needed to reprogram the DMAC to transfer data from RAM to a universal serial bus (USB) interface.

Mistakes are often made by developers when writing code needed to program or reprogram a DMAC or other components of a MCU that are needed for a DMA transfer. For example, a developer may intend to write code that sets up a DMA transfer data from UART to a particular buffer in RAM, but the developer may accidently write code that transfers data from the USB interface. Additionally developers often make a mistake in the sequence in which control values are written to registers. When these types of coding errors are made, they can be very difficult to debug because one end of the transfer is usually a peripheral or buffer in RAM that cannot be easily inspected.

SUMMARY OF THE INVENTION

A method and system for programming a microcontroller (MCU) having a flash memory, a central processing unit (CPU) and a direct memory access controller (DMAC). In one embodiment, the method of programming includes calling a function stored in the flash memory, wherein a first parameter is passed to the function when it is called, wherein the first parameter identifies a first data structure that is stored in flash memory, and wherein the first data structure includes first DMAC control values. The CPU reads the first DMAC control values in response to the CPU executing instructions of the function. The CPU then writes the first DMAC control values to respective control registers of the DMAC in response to the CPU executing instructions of the function. Once the first DMAC control values are written to the respective control registers, the MCU is programmed to implement a DMA transfer.

BRIEF DESCRIPTION OF THE DRAWINGS

The present invention may be better understood in its numerous objects, features, and advantages made apparent to those skilled in the art by referencing the accompanying drawings.

The use of the same reference symbols in different drawings indicates similar or identical items.

DETAILED DESCRIPTION

An apparatus and method is described for programming one or more components of an MCU at runtime to implement a data transfer. In general the method of programming the one or more components includes a CPU writing the appropriate control values to respective control registers. The data transfer can start once the components are programmed. In one embodiment, the one or more components are programmed at run time using a function (hereinafter referred to as the activation function AF) written in the C programming code, and a structure (hereinafter data transfer structure DTS), the tag or identity of which is passed as a function argument to the AF when it is called. The data transfer structure DTS may be one of several DTSs in an array, with each DTS including, in one embodiment, control values to be written to control registers of, for example, a DMAC. If the one or more components of the MCU require reprogramming in order to implement a different data transfer, the one or more components are reprogrammed by calling the activation function AF again and passing a different DTS tag or identity thereto. In addition to the foregoing, this disclosure also describes a tool and method that can be used by developers for generating the DTSs and other aspects of an embedded program. While the present invention will be described with reference MCUs, the present invention should not be limited thereto.

Figure 1:
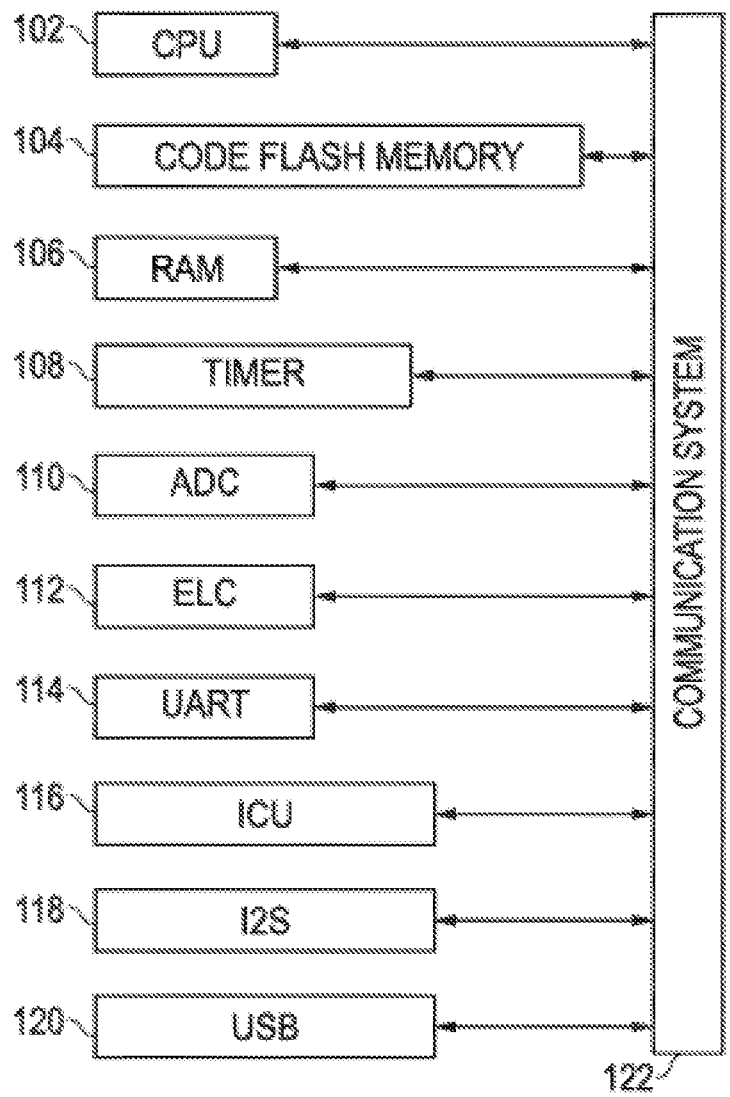
FIG. 1 illustrates an example MCU shown in block diagram form, employing one embodiment of the present disclosure.

FIG. 1 is a block diagram illustrating relevant components of an example MCU 100 in which the aforementioned activation function AF can be used. The term MCU should not be limited to that shown in FIG. 1. MCU 100 contains a CPU 102 and memory components, including flash memory 104, random access memory (RAM) 106, and registers (not shown). MCU 100 also contains peripherals 108-120, and a communication system 122 through which the various components (e.g., RAM 106 and UART 114) communicate with each other. As will be more fully described below, communication system 122 includes a programmable DMAC. Additional components of MCU 100, such as general purpose input/output (I/O) ports, are contemplated, but not shown.

Flash memory 104 stores an embedded program that includes a main function, the activation function AF, and an array containing one or more DTSs. The embedded program may further include functional libraries, hardware abstraction layer (HAL) drivers, communication stacks, real time operating systems (RTOSs), etc. In the past embedded programs were written in assembly language, but various high-level languages such as C are now used to write code for MCUs. The present disclosure will be described with reference to an embedded program written in C, it being understood the present invention should not be limited thereto.

Some MCU manufacturers a provide integrated development environment (IDE), which is a set of tools to aid embedded program development. IDEs typically include tools such as editors, compilers and linkers. A compiler is a computer program (or a set of programs) that transforms source code written in C into object code. A linker is a computer program that takes one or more files of object code and combines them into a single executable file. The present disclosure contemplates an IDE that also includes a graphical programming tool (hereinafter referred to as the pipes and signals tool or PST) that developers can use to generate one or more source code files that contain C structures (e.g., DTSs), constants, declarations, etc., that are needed to program components of the MCU for implementing one or more data transfers in accordance with the present disclosure. As will be more fully described below, the pipes and signals tool PST can generate the source code files based on graphical representations of data transfers created by developers. The one or more source files created by the PST can be compiled and linked with other source code files, including a file that contains the AF, to create an embedded program.

RAM memory 106 is typically used for storing data variables, arrays of one or more data buffers, etc., that are defined and used by the embedded program. As will be more fully described below, variables and arrays can be specified by a developer using the pipes and signals tool PST. MCUs also contain registers (not shown), which are special, rapidly accessible, dedicated memory circuits located within CPU 102, peripherals 108-120, and communication system 122. Registers are used to store calculation results, states, control values, and other information crucial to embedded program execution. As will be more fully explained below, several control registers can be programmed to implement a data transfer such as a DMA transfer in accordance with the present disclosure. The present invention will be described with reference to programming components to implement a DMA data transfer, it being understood the present invention can be broadly applied to other types of data transfers including programmed I/O.

CPU 102 executes instructions of the embedded program. Although not shown CPU 102 includes: an arithmetic logic unit (ALU) that performs arithmetic and logic operations; registers that supply operands to the ALU and store the results of ALU operations, and; a control unit that controls the fetching (from flash memory) and execution of instructions, including instructions of the AF. The present invention will be described with reference to a MCU that includes one CPU 102, it being understood the present invention should not be limited thereto.

With continuing reference to FIG. 1, peripherals 108-120 are hardware components that implement a variety of dedicated functions, enabling easier deployment in a variety of settings. The availability of specific peripherals in a particular MCU depends fully on the make/model of the device. The peripherals of MCU 100 can be programmed by writing values that control their operational aspects. The control values are written by CPU 102 to particular address locations inside the address-map of the MCU. Similarly, peripherals of MCU 100 are used by writing or reading data from particular address locations. CPU 102 writes control values to the peripherals in accordance with instructions of the embedded program in flash memory 104.

The example peripherals in FIG. 1 includes a general purpose timer 108, an analog/digital converter (ADC) 110, an event logic controller (ELC) 112, a UART 114, an interrupt control unit (ICU) 116, an I$^2$S interface 118, and a Universal Serial Bus (USB) module 120.

Figure 2A:
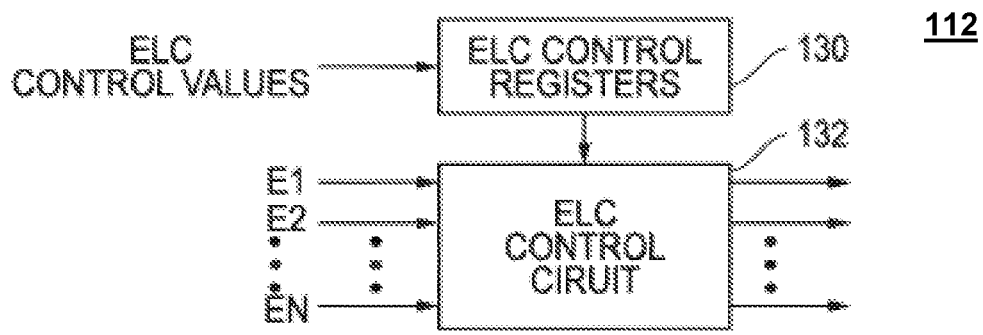
FIG. 2A is block diagram illustrating an event link controller employed in the MCU of Figure.

FIG. 2A shows relevant components of an example ELC 112, which includes ELC control registers 130 and an ELC control circuit ELC 132. ELC control circuit 132 receives event signals E1-EN from components such as USB module 120, ADC 110, etc. ELC circuit 132 can operate like a programmable switch matrix. In other words, ELC circuit 112 can be programmed by CPU 102 to switch any one of the received event signals E1-EN to any one of its outputs for subsequent transmission to a component. For example, ELC circuit 112 can be programmed to transmit an event signal from a peripheral to the DMAC in order to trigger a DMA transfer, or ELC 112 can be programmed to transmit an event signal from the DMAC to ICU 116 in order to trigger an ISR. The switching is based on control values written to control registers 130 by CPU 102. Importantly, ELC 112 can be programmed in accordance with AF instructions that are executed by CPU 102.

As noted, MCU 100 includes ICU 116. In general ICUs operate to interrupt sequential CPU execution of instructions in favor an ISR. ICU 116 receives internally generated interrupt signals, including interrupt signals from the DMAC, either directly or indirectly via the ELC 112. In one embodiment, ICU 116 can provide CPU 102 with the memory address of an ISR that corresponds to the interrupt signal received by ICU 116 from the DMAC. CPU 102 implements the ISR stored in flash memory 104 beginning at the address provided by ICU 116. CPU 102 can program ICU 116 to trigger an ISR when a particular event signal is asserted. For example, ICU 116 can be programmed by the AF to look for a signal from the DMAC that indicates a data block has been written to RAM 106. And when the DMAC asserts the signal, ICU 116 initiates the ISR, which in turn processes the data block written to RAM 106. In one embodiment, the ISR can be generated in part by the pipes and signals tool PST as will be more fully described below.

Figure 2B:
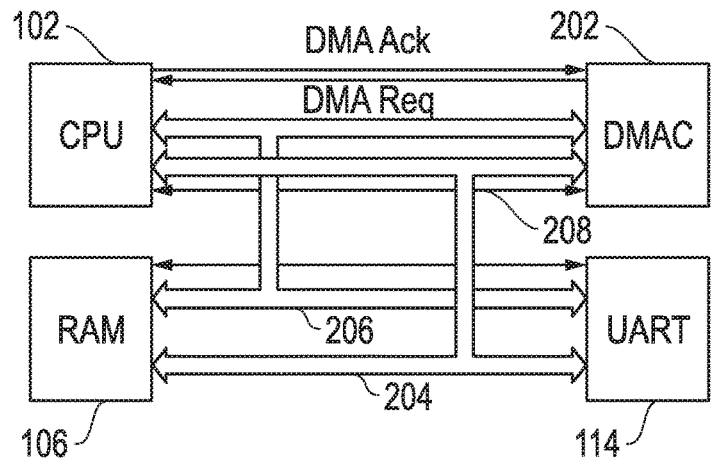
FIG. 2B is block diagram illustrating relevant aspects of an example DMA transfer implemented by the MCU of FIG. 1.
Figure 4:
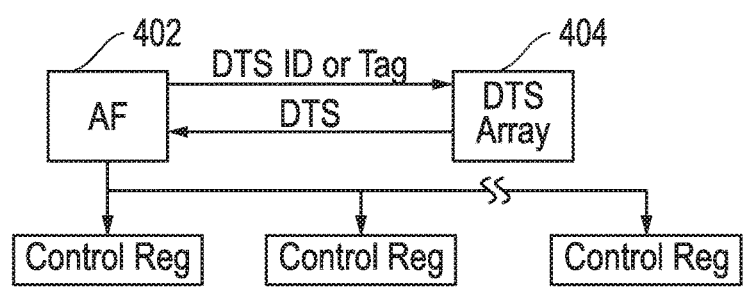
FIG. 4 is a block diagram that illustrates an example activation function AF and an array of data transfer structures (DTSs) stored in flash memory of the MCU in FIG. 1 according to one embodiment of the present disclosure.

MCU 102 includes a communication system 122, which in turn includes one or more buses that can transmit data, control values, instructions, addresses, control signals, etc., between memory components, CPU 102, peripherals 108-120, etc. In the embodiment shown, communication system 122 includes separate buses for transferring instructions and data, including control values, thereby allowing data and instruction accesses to take place concurrently. Communication system 122 also includes a programmable DMAC for controlling DMA transfer of data. FIG. 2B illustrates an example DMAC 202 of communication system 122, which is in data communication with CPU 102, RAM 106, via address bus 204, data bus 206, and control line(s) 208.

DMAC 202 can be programmed to implement DMA data transfers. In the illustrated example, an event (such as a data-availability signal from UART 114) notifies DMAC 202 that data that is ready to be transferred. The DMAC 202 then asserts a DMA request signal to CPU 102, asking its permission to use data bus 206. CPU 102 completes its current bus activity, stops driving bus 206, and returns a DMA acknowledge signal to DMAC 202. In response DMAC 202 reads a byte of data from UART 114, and writes the data to RAM 106, driving the address bus 204, data bus 206, and control signal lines 208 as if it were the CPU. In general each DMA cycle will typically result in at least two bus cycles: either a peripheral read followed by a memory write or a memory read followed by a peripheral write, depending on the transfer base addresses. It is noted that DMAC 202 can also transfer data between peripherals.

DMAC 202 does no processing on data it transfers. It just transfers the bytes as instructed by control values programmed into its control registers. When the transfer is complete, the DMAC 202 stops driving the buses and deasserts the DMA request signal. CPU 102 can then remove its DMA acknowledge signal and resume control of buses 204 and 206. CPU 102 can also receive an address for an ISR via ICU 116 when the DMA transfer is complete so that CPU 102 can process the transferred data in accordance with the ISR.

As noted above, before a DMA transfer can begin, CPU 102 must program the DMAC 202 and/or other components such as ELC 112 or ICU 116. The programming process is a very complicated, and involves CPU 102 writing appropriate control values to respective control registers of DMAC, vector addresses to a vector table of ICU 116, etc. Example control values programmed into the DMAC 202 include; the base address of the source (e.g., a data receive register in UART 114) where data is to be read, the base address of the destination (e.g., a buffer in RAM 106) where the data is to be written, the number of data bytes (words) to be transferred, the width of each data byte (word) to be transferred, whether the DMA controller should generate a CPU interrupt signal once the transfer is complete. Depending on a control value programmed into the DMAC 202, it's possible the DMAC will automatically increment one or both of the source and destination addresses after each byte (word) transfer. Some data transfers between peripherals, or between memory and a peripheral often require that the peripheral source or destination address is not incremented after each transfer. A different control value is needed for data transfers in which the source or destination address is not incremented.

A DMAC typically has several DMA channels that share a bus for transferring data, but are otherwise independent. Each of the DMA channels contains its own set of memory-mapped, programmable control registers. The CPU can program each DMA channel with a priority value, which gives precedence of one DMA channel over another. Each DMA channel can programmed so that its data transfer is triggered by an event or control signal from a peripheral, the CPU, etc. Data movement in a particular DMA channel can be initiated by either hardware or software triggers depending on how the DMA channel is programmed. For example, a status bit for UART 114 may switch thus indicating new data is ready for DMA transfer to a buffer in RAM 106, or the status bit for $I^2S$ 118 may switch to indicate it needs new data for subsequent transfer to a device external to MCU 102. When a DMA channel is programmed and receives a trigger, it begins moving data as soon as the needed resources become available (e.g., a bus and memory locations). ELC 112 may be programmed by to forward the appropriate event signals to respective DMA channels.

DMAC 202 can be programmed and reprogrammed to implement different DMA transfers. For example, one DMA channel of DMAC 202 can be programmed to implement a data transfer from the USB block 120 to a buffer in RAM 106. At a later time, the same DMA channel can be reprogrammed to implement a data transfer from another block in RAM 106 to $I^2S$ 118. Or two DMA channels can be simultaneously programmed to implement data transfers: one to implement a data transfer from the USB block 120 to a buffer in RAM 106, and another to implement a data transfer from another block in RAM 106 to $I^2S$ 118.

In the past, DMAC 202 and other components were programmed or reprogrammed using separate code segments. Writing the code segments, however, is a complex and time consuming. Before they can successfully write the code segments, embedded program developers need intimate knowledge and understanding of MCUs, which have become increasingly complex. A typical MCU user's manual can now exceed 1,000 pages. Components like the DMAC 202 have mushroomed in new features and capabilities, making them even more difficult to completely understand and properly configure into a desired mode of operation. Unfortunately, the overall complexity of DMACs has led to errors when writing code segments. Unless developers follow the rules dictated by a complex and lengthy MCU user's manual, their embedded programs often fail to implement desired DMA data transfers.

The present disclosure addresses these problems and other, and provides an activation function AF that, when executed by CPU 102, programs components, including the DMAC 202, for implementing data transfers according to any one of a number of DTSs of an array in flash memory 104. In one embodiment, CPU 102 programs components with control values, vector addresses, etc., in response to calling the aforementioned AF. The programming process may further include updating a vector table of ICU 116 to include a vector address for an ISR that CPU 102 implements if interrupted by the DMAC, etc. The control values and/or other data needed to program DMAC 202, ELC 112, ICU 116, etc., are determined by a DTS identified in a tag that is passed in the call to the AF. The AF can be developed and provided by the manufacturer of MCU 102 or others who have a complete understanding of MCU 102 including DMAC 202. The AF can program MCU components in a sequence that is compatible with the requirements of MCU 100. The AF and array of DTSs can be compiled and linked with other embedded program components during development thereof.

The present disclosure also contemplates an IDE with a pipes and signals tool PST that creates the DTSs, declarations, etc., based on graphical representations of DMA transfers. The PST provides a graphical programming interface (GPI) through which developers can graphically specify one or more DMA transfers in MCU 102. In one embodiment, a graphical representation of a data transfer is built by dragging and dropping graphical representations of components, such as DMAC 202, buffers in RAM 106, peripherals (e.g., UART 114), onto the GPI. The developer can then add data lines and/or signal lines between the component representations. A data line specifies a data transfer from one component representation to another. A signal line specifies an event signal generated by one component that is received by another component. In response to receiving the event signal, the component initiates some action. For ease of explanation, component representation will be referred to as "component" when referenced with respect to the GPI, except where noted.

The PST provides configuration wizards. A developer can specify DMA transfer parameters for the components and lines displayed by the GPI using the configuration wizards. Example transfer parameters include, but are not limited to, the width of data to be transferred between the components, name of a buffer or an array of buffers in RAM 104 that receives transferred data, the size of a buffer, the identity of the DMA channel through which data is to be transferred, the identity of an event that triggers the transfer of data, data sample rate, etc. The PST can store the graphically specified data transfer, including the transfer parameters thereof, into a "map" file. A map file may contain more than one graphically designed data transfer. A developer can create additional files that contain additional graphically designed data transfers.

The PST can process map files to generate one or more source files that contain the DTS array, definitions of buffers or arrays of buffers, partial ISRs, etc. Each DTS generated by the PST may include the control values, addresses where the control values are to be written by the AF, etc. A DTS enables the AF to write the control values directly or indirectly to the control registers at runtime via the appropriate HAL modules. Importantly, the PST and AF preclude the need for developers to consult a large user guide in order to write complex code for programming DMAC 202 and other components at run time.

The source files generated by the PTS can be compiled with and linked to other source files to create an embedded program. The result can be programmed into flash memory 104. At runtime, identities (e.g., tags) of DTSs are passed with calls to the AF. The AF writes binary control values of a DTS to control registers in DMAC 202, either directly or indirectly via one or more HAL modules. The AF may write additional control values or other information of the DTS to other components such as ELC 112 or ICU 116. Thus, the AF operates to program DMA transfers by writing one or more binary control values of a corresponding DTS to respective control registers. For example, the AF can implement a data transfer defined by DTS1 after reading control values thereof and writing them to respective control registers. At a later time, the AF when called again can write a whole new set of binary control values to registers of DMAC 202 in order to in order to implement a different DMA transfer in accordance with another DTS.

As noted above, the present disclosure contemplates an IDE, which includes a PST. With continuing reference to FIGS. 1-2B, FIG. 3 illustrate relevant aspects of an example PST executing on computer system 300. The PST provides GPI 302 in which developers can graphically specify one or more data transfers. In the illustrated example, GPI 302 is used to specify first and second DAM data transfers.

Figure 3:
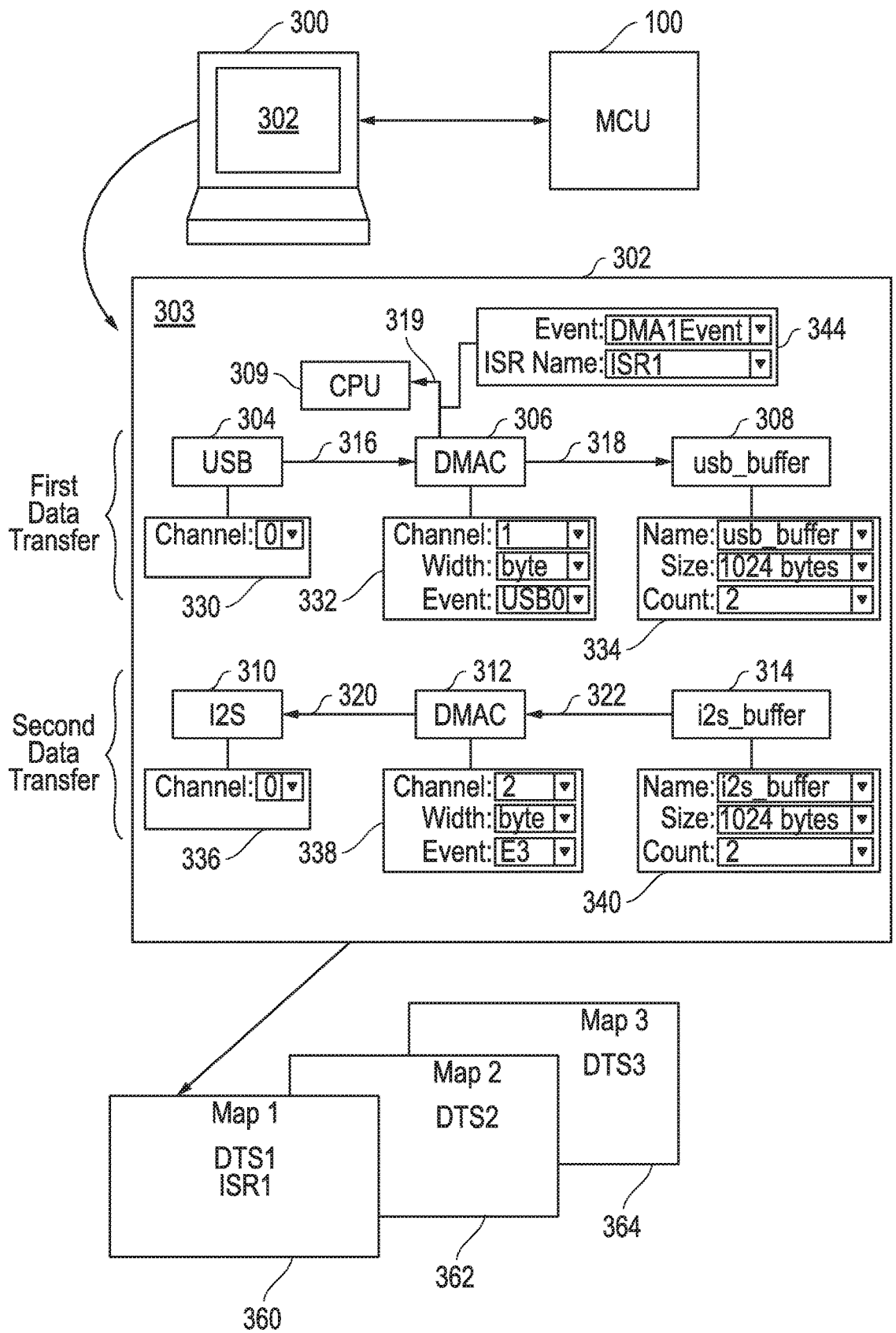
FIG. 3 is a block diagram illustrating various aspects of a tool for use in programming flash memory of the MCU shown in FIG. 1.

With continuing reference to FIGS. 1 and 3, the first DMA is created by dragging and dropping graphical representations 304-309 of USB module 120, DMAC 202, a buffer (i.e., usb_buffer) in RAM 106, and CPU 102, respectively, onto GPI 302. Data lines 316 and 318 are added and define data flow from USB module 120 to usb_buffer via DMAC 202. Signal line 319 and the graphical representation of CPU 102 are added to define an interrupt signal (i.e., DMA1Event) that can be generated by DMAC 202 for initiating an ISR (i.e., ISR1). The second DMA transfer is created by dragging and dropping graphical representations 310-314 of I$^2$S 118, DMAC 202, and a buffer array (i.e., u$^2$s_buffer) in RAM 106, respectively, onto GPI 302. Data lines 320 and 322 are added to define data flow from USB module 120 to a buffer array (i.e., usb_buffer) in RAM 106 via DMAC 202.

GPI 302 also shows configuration wizards 330-344 though which a developer can specify parameters for the first and second DMA transfers. Configuration wizards are displayed by right-clicking on a displayed component or line (e.g., signal line 319). Each configuration wizard contains one or more fields into which a developer can enter parameters (e.g., channel number, buffer array name, data width, etc.) needed to create DTSs, define buffers, link an interrupt signal to an ISR, etc. For example, configuration wizard 332 contains fields that enable a user to enter parameters for the first data transfer, including: DMA channel number (i.e., channel 1) through which data is to be transferred, width (i.e., byte) of the data to be transferred, an identity (i.e., USB0) of an event signal that triggers the data transfer. In the illustrated example, the signal selected to trigger the first data transfer to usb_buffer is the signal generated by channel 0 of USB 120 when its buffer contains data to be transferred. Some of the parameters can be selected through a drop down menu. For example, configuration wizard 332 includes a drop down menu from which a developer can select any one of many internally generated event signals, such as event signal USB0. PST can generate the control values needed for programming ELC 112 so that it switches event signal USB0 to DMAC 202. Configuration wizard 334 allows a developer to specify parameters for buffers used in the first data transfer, including the name (i.e., usb_buffer), size of each buffer (i.e., 1024 bytes), and number (i.e., 2) of buffers in the array. Configuration wizards can be unique to their corresponding components. For example, the configuration wizard for the DMAC may contain fields that are different from fields contained in the configuration wizard for a buffer. Data lines such as data lines 316 and 318 can be used by the PST to define several control values for a DMA transfer. In the illustrated embodiment, data lines 316 and 318 defines USB Channel 0 and usb_buffer as the source and destinations for the first DMA transfer given their connection in GPI 302. This information enables the PST to select the appropriate values for the source and destination control registers of channel 1 in DMAC 202. Additionally, this information enables the PST to select the appropriate control value for the channel's DCR register so that the DMA channel can correctly interface with USB 120 and RAM 106.

The PST enables a developer to define partial ISRs for use in embedded programs. The partial ISRs can be edited by a developer to include instructions for processing data transferred to RAM 106 via a DMA transfer. In one embodiment, the ISRs can be initiated in response to the DMAC 202 generating an interrupt signal after it has completed the data transfer to RAM 106 via DMAC 202. GPI 302 can be used to link interrupt signals generated by DMAC 202 to respective ISRs. The partial ISR is generated with code that provides CPU 202 with the location and quantity of data in RAM to be processed. In the illustrated example in FIG. 3, CPU representation 309 was dragged and dropped onto GPI 302 to set up a partial ISR related to the first data transfer. Signal line 319 was added to define parameters for the ISR. These parameters can be defined using configuration wizard 344. In the illustrated example, configuration wizard 344 is used by a developer to define ISR1, the name of the ISR, and DMA1Event, the identity of the interrupt signal, wherein DMA1Event is the signal generated by the DMA channel 1 when it has completed its data transfer to usb_buffer at runtime. PST uses the parameters entered in configuration wizard 344 and other information to create a partial ISR, which initially includes code that tells CPU 202 where the usb_buffer is located. The developer can then add additional code to the partial ISR using an IDE editor, for processing the data stored in usb_buffer.

With continuing reference to FIGS. 1-3, FIG. 4 illustrates block diagram representations of AF 402 and an array 404 of DTSs stored in flash memory 104. AF 402 takes form in instructions executing on CPU 102, and is unique to the architecture of MCU 100. CPU 102 can access array 404 using a tag (hereinafter DTS ID) passed in a call to AF, which identifies a DTS in array 404. For purposes of explanation, it will be presumed that the program embedded in flash memory 104 includes multiple instructions to call AF, each of which includes a separate DTS ID as an argument. In other words the call instructions are identical to each other, except for the DTS ID argument. The array 404 maps DTS IDs to respective DTSs. Each DTS defines one or more binary control values. Additionally, each DTS may define addresses or other identities of control registers where the binary control values are to be written. Additional information may be stored in each DTS. AF 402 directly or indirectly (via one or more HAL modules) writes binary control values defined in the DTS to the appropriate control registers of DMAC 202. One of ordinary skill understands that once the control values are written to the DMAC 202, the DMAC 202 is programmed to implement the data transfer corresponding to the DTS.

Figure 5:
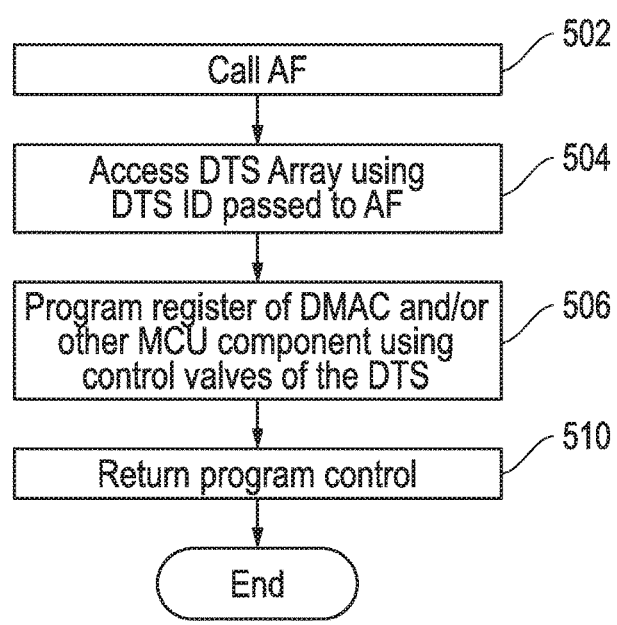
FIG. 5 is a flow chart illustrating relevant aspects of a method implemented by the MCU of FIG. 1 according to one embodiment of the present disclosure.

FIG. 5 illustrates an example process implemented by AF 402 according to one embodiment. The process is started in response to CPU 102 executing an instruction to call AF 402. In response, CPU 102 while executing AF 402, accesses array 404 using the DTS ID passed in the call instruction, and reads binary control values of the DTS mapped to the DTS ID. In step 506, the binary control values read in step 504 are written directly or indirectly to respective control registers of DMAC 202 and/or other components of MCU 100. Once DMAC 202 and/or other components are programmed, program control is returned to the embedded program as shown in step 510.

It is noted that AF 402 is specific to the architecture of MCU 102. AF 402 can be downloaded to a computer system via the Internet, where it can be compiled and linked to other source code components. AF 402 eliminates the need for program developers to write complex code for programming respective DMA data transfers. Rather, program developers need only add call instructions that pass DTS IDs to AF 402 in order to implement respective data transfers. This greatly simplifies the task of developing a bug free embedded program for an MCU. DTSs can be created and subsequently downloaded into program memory 104 using the PST mentioned above. In one embodiment, the PST may take form in instructions executing on a microprocessor of a computer system. Like the AF, the wizard can be downloaded from a server computer system via the Internet. The AF can be downloaded by itself or in a package that contains a code editor, compiler and a linker.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method implemented in a microcontroller (MCU), the MCU comprising flash memory, a central processing unit (CPU) and a direct memory access controller (DMAC), the method comprising:

calling a function stored in the flash memory, wherein a first parameter is passed to the function when it is called, wherein the first parameter identifies a first data structure that is stored in flash memory, wherein the first data structure comprises first DMAC control values for controlling a first DMA transfer of data between components of the MCU;

the CPU reading the first DMAC control values in response to the CPU executing instructions of the function;

the CPU writing the first DMAC control values to respective control registers of the DMAC in response to the CPU executing instructions of the function;

calling the function a second time, wherein a second parameter is passed to the function when it is called the second time, wherein the second parameter identifies a second data structure that is stored in flash memory, wherein the second data structure comprises second DMAC control values for controlling a second different DMA transfer of data between components of the MCU;

the CPU reading the second DMAC control values in response to calling the function a second time; and the CPU overwriting the first DMAC control values with the second DMAC control values.

2. The method of claim 1 wherein the MCU comprises a first peripheral, and wherein the first data structure comprises first peripheral control values, wherein the method further comprises:

the CPU reading the first peripheral control values in response to the CPU executing instructions of the function;

the CPU writing the first peripheral control values to respective control registers of the first peripheral in response to the CPU executing instructions of the function.

3. The method of claim 2 wherein the first peripheral comprises an interrupt control unit.

4. The method of claim 3 wherein the first data structure comprises a first address for a first interrupt service routine, and wherein the method further comprising the CPU writing the first address to an entry of a vector interrupt table in response to the CPU executing the instructions of the function.

5. The method of claim 2 wherein the first peripheral comprises an event link controller.

6. The method of claim 1 further comprising:
the DMAC reading first data after the first DMAC control values are written to the respective control registers of the DMAC;
the DMAC writing the first data to a first buffer after the first DMAC control values are written to the respective control registers of the DMAC.

7. Flash memory in an MCU, the flash memory comprising instructions executable by a central processor unit (CPU) of the MCU, wherein the CPU implements a method in response to executing the instructions, the method comprising:
calling a function stored in the flash memory of the MCU, wherein a first parameter is passed to the function when it is called, wherein the first parameter identifies a first data structure that is stored in the flash memory, wherein the first data structure comprises first direct memory access controller (DMAC) control values for controlling a first DMA transfer of data between components of the MCU;
the CPU reading the first DMAC control values in response to the CPU executing instructions of the function;
the CPU writing the first DMAC control values to respective control registers of the DMAC in response to the CPU executing instructions of the function;
calling the function a second time, wherein a second parameter is passed to the function when it is called the second time, wherein the second parameter identifies a second data structure that is stored in the flash memory, wherein the second data structure comprises second DMAC control values for controlling a second different DMA transfer of data between components of the MCU;
the CPU reading the second DMAC control values in response to calling the function a second time; and
the CPU overwriting the first DMAC control values with the second DMAC control values.

8. The flash memory of claim 7 wherein the MCU comprises a first peripheral, wherein the first data structure comprises first peripheral control values, and wherein the method further comprises:
the CPU reading the first peripheral control values in response to the CPU executing instructions of the function;
the CPU writing the first peripheral control values to respective control registers of the first peripheral in response to the CPU executing instructions of the function.

9. The flash memory of claim 8 wherein the first peripheral comprises an interrupt control unit.

10. The flash memory of claim 7 wherein the first data structure comprises a first address for a first interrupt service routine stored in the flash memory, and wherein the method further comprising the CPU writing the first address to an entry of a vector interrupt table in response to the CPU executing the instructions of the function.

11. The flash memory of claim 8 wherein the first peripheral comprises an event link controller.

12. The flash memory of claim 7 wherein the method further comprises:
the DMAC reading first data after the first DMAC control values are written to the respective control registers of the DMAC;
the DMAC writing the first data to a first buffer in the MCU after the first DMAC control values are written to the respective control registers of the DMAC.

13. A method comprising:
a server computer system transmitting instructions to a computer system via a network, wherein a central processor unit (CPU) of an MCU, in response to executing the instructions, can implement a method for programming the MCU to implement a data transfer, the programming method comprising:
the CPU reading first direct memory access controller (DMAC) control values stored in flash memory of the MCU, the first DMAC control values for controlling a first DMA transfer of data between components of the MCU;
the CPU writing the first DMAC control values to respective control registers of the DMAC of the MCU;
the CPU reading second DMAC control values from the flash memory, the second DMAC control values for controlling a second different DMA transfer of data between components of the MCU; and
the CPU overwriting the first DMAC control values in the control registers with the second DMAC control values.

14. The method of claim 13 wherein the MCU comprises a first peripheral, wherein the first data structure comprises first peripheral control values, and wherein the programming method further comprises:
the CPU reading the first peripheral control values;
the CPU writing the first peripheral control values to respective control registers of a first peripheral of the MCU.

15. The method of claim 14 wherein the first peripheral comprises an interrupt control unit.

16. The method of claim 15 wherein the first data structure comprises a first address for a first interrupt service routine stored in the flash memory, and wherein the programming method further comprising the CPU writing the first address to an entry of a vector interrupt table in the interrupt control unit.

17. The method of claim 14 wherein the first peripheral comprises an event link controller.

* * * * *